United States Patent
Vollmer et al.

(10) Patent No.: US 8,074,779 B2
(45) Date of Patent: Dec. 13, 2011

(54) CLUTCH SYSTEM WITH A HYDRAULICALLY ACTUATED CLUTCH DEVICE

(75) Inventors: Frank Vollmer, Ingolstadt (DE); Arne Krüger, Karlsruhe (DE); Dieter Schrag, Hemmingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 736 days.

(21) Appl. No.: 12/170,692

(22) Filed: Jul. 10, 2008

(65) Prior Publication Data

US 2009/0014275 A1 Jan. 15, 2009

(30) Foreign Application Priority Data

Jul. 10, 2007 (DE) .................. 10 2007 032 042

(51) Int. Cl.
*F16D 25/08* (2006.01)
(52) U.S. Cl. .................. 192/85.57; 192/85.63
(58) Field of Classification Search ............... 192/85.53, 192/85.55, 85.56
See application file for complete search history.

(56) References Cited

U.S. PATENT DOCUMENTS

| | | | |
|---|---|---|---|
| 5,135,091 A * | 8/1992 | Albers et al. ............... | 192/85.63 |
| 5,217,097 A * | 6/1993 | Lasoen ........................ | 192/3.58 |
| 6,247,487 B1 | 6/2001 | Skill | |
| 6,505,529 B1 | 1/2003 | Legner et al. | |
| 6,658,842 B2 | 12/2003 | Yamasaki et al. | |
| 6,889,811 B2 | 5/2005 | Ebert et al. | |
| 2003/0056640 A1 | 3/2003 | Yamasaki et al. | |
| 2006/0042907 A1* | 3/2006 | Ronk et al. ................... | 192/85 C |
| 2006/0042908 A1* | 3/2006 | Ronk et al. ................... | 192/85 R |
| 2006/0065509 A1* | 3/2006 | Pritchard ................. | 192/85 AA |

FOREIGN PATENT DOCUMENTS

| | | |
|---|---|---|
| DE | 19500998 C1 | 6/1996 |
| DE | 19846955 A1 | 4/2000 |
| DE | 101 01 438 A1 | 8/2002 |
| EP | 1296065 A1 | 3/2003 |
| EP | 1 356 212 B1 | 10/2003 |

OTHER PUBLICATIONS

German Search Report dated May 27, 2009.

* cited by examiner

*Primary Examiner* — Rodney Bonck

(57) ABSTRACT

A clutch system has a clutch device, an actuating device for the hydraulic actuation of the clutch device, and a hydraulic system. The hydraulic system includes a master cylinder that is actuated by the actuating device, a slave cylinder for actuating the clutch device fluidically connected with the master cylinder through a pressure line. A first branch line is connected to the pressure space of the master cylinder or between the pressure spaces of the master cylinder and slave cylinder. The first branch line is also connected to a compensating tank volume. A second branch line is connected to the pressure space of the slave cylinder or arranged between the pressure spaces of the master and slave cylinders. The second branch line is also connected to the compensating tank volume. A device is disposed to blocking the second branch line during an actuation of the clutch device by way of the actuating device. This provides for an inherently safe, self-ventilating hydraulic system.

7 Claims, 1 Drawing Sheet

CLUTCH SYSTEM WITH A HYDRAULICALLY ACTUATED CLUTCH DEVICE

CROSS-REFERENCE TO RELATED APPLICATION

This application claims the priority, under 35 U.S.C. §119, of German patent application DE 10 2007 032 042.8, filed Jul. 10, 2007; the prior application is herewith incorporated by reference in its entirety.

BACKGROUND OF THE INVENTION

Field of the Invention:

The invention relates to a clutch system with a clutch device, an actuating device for the hydraulic actuation of the clutch device, and a hydraulic system. The hydraulic system has a master cylinder which can be actuated by way of the actuating device, a slave cylinder, which is connected to the master cylinder by way of a pressure line, for actuating the clutch device, a (first) branch line which is connected to the pressure space of the master cylinder or is disposed between the pressure spaces of the master cylinder and slave cylinder, and a compensating tank volume to which the first branch line is connected.

Use is made largely of hydraulic releasing systems for actuating the clutch in vehicles with shift transmissions, in particular manual shift transmissions. The systems are composed in particular of the pedal arrangement, the master cylinder, the line and the slave cylinder with releasing or a central releaser. The master cylinder is actuated by the driver via the clutch pedal and the slave cylinder actuates the clutch via the release lever and the release bearing or the central releaser directly actuates the clutch. The clutch hydraulics are connected via the master cylinder to a compensating tank.

On account of different phenomena, air inclusions can occur in the clutch hydraulics. In the majority of motor vehicles, sufficient self-ventilating is possible via the master cylinder and compensating tank by means of a rising pressure line from the slave cylinder to the master cylinder.

If self-ventilating of the clutch hydraulics via the master cylinder is hindered by a long pressure line, line sections with a small gradient and/or siphons, this can lead to an accumulation of the air inclusions and therefore to a displacement of the release force characteristic curve of the clutch. The displacement causes inter alia a change in the resulting pedal restoring force and a reduction of the free movement of the clutch. The correct functioning of the clutch system, in particular of the pedal arrangement, release system and clutch, is therefore no longer ensured.

A clutch system of the generic type specified in the above text is known from practice.

European patent EP 1 356 212 B1 and its counterpart U.S. Pat. No. 6,889,811 B2 describe an hydraulically actuable clutch system which is provided with a ventilation device for the hydraulic system. In that clutch system, two valves—a supply valve and a discharge valve—are opened together for the ventilation of the hydraulic slave cylinder, such that flow passes through the hydraulic system for a certain period of time and the resulting oil flow ventilates the slave cylinder.

German published patent application DE 101 01 438 A1 discloses a ventilation device for a hydraulic system in a clutch system. That ventilation device is characterized by an automatic mode of operation. There, the ventilation takes place if a pressure is built up in the initially unpressurized hydraulic system. For this purpose, a ventilation valve is arranged at the highest point of a line of a slave cylinder. An electromagnetic control valve is situated between the ventilation valve and a pressure accumulator, with the ventilation valve being connected via a recirculation line to a compensating tank. The ventilation valve comprises a valve housing, a valve body and a preload spring. The mode of operation of the ventilation valve assumes that the system to be ventilated is at least briefly unpressurized. In the unpressurized state, the valve body of the ventilation valve is pressed under the force of the preload spring against a lower sealing surface of the valve housing, and thereby prevents the infiltration of air from the recirculation line. If the control valve is opened, the valve body rises up from the lower sealing face and air present in the recirculation line can escape.

SUMMARY OF THE INVENTION

It is accordingly an object of the invention to provide a clutch system with an hydraulically actuated clutch which overcomes the above-mentioned disadvantages of the heretofore-known devices and methods of this general type and which provides for an inherently safe, self-ventilating hydraulic system.

With the foregoing and other objects in view there is provided, in accordance with the invention, a clutch system, comprising:

a clutch device and an actuating device for hydraulically actuating said clutch device; and an hydraulic system, said hydraulic system including:
a master cylinder to be actuated by way of said actuating device, said master cylinder having a pressure space;
a slave cylinder for actuating said clutch device, said slave cylinder having a pressure space;
a pressure line connecting said master cylinder with said master cylinder;
a compensating tank volume;
a first branch line communicating with said compensating tank volume and connected to said pressure space of said master cylinder or between said pressure space of said master cylinder and said pressure space of said slave cylinder;
a second branch line communicating with said compensating tank volume and connected to said pressure space of said slave cylinder or between said pressure space of said master cylinder and said pressure space of said slave cylinder; and
means for blocking said second branch line during an actuation of said clutch device by way of said actuating device.

In other words, the objects of the invention are achieved in that a further (second) branch line is provided in the hydraulic system so as to be connected to the pressure space of the slave cylinder or arranged between the pressure space of the master cylinder and slave cylinder. The second branch line is also connected to the compensating tank volume. Finally, a blocking device (e.g., a valve) is provided for blocking the further branch line during an actuation of the clutch device by the actuating device.

The design according to the invention makes it possible to conduct the hydraulic liquid in the hydraulic system via the two branch lines in the circuit when the second branch line is not blocked, and to thereby obtain sufficient self-ventilation of the hydraulic system. This is the case in particular when the pressure line from the slave cylinder to the master cylinder rises. It is considered to be particularly advantageous if the first branch line is connected to the pressure space of the master cylinder and the second branch line is connected to the pressure space of the slave cylinder.

The clutch system according to the invention ensures a permanent exchange or purging of the hydraulic system, and therefore an exchange of the hydraulic liquid including the air contained therein during normal driving operation. The air-liquid mixture is conducted to the compensating tank in which air separation takes place. The energy required for a provided permanent purging of the hydraulic system can be imparted for example by using a pump, by means of the pressure build-up during the clutch actuation, thermodynamic effects or by means of other stimuli such as pressure fluctuations in the clutch hydraulics.

To actuate the clutch device, the second branch line must be closed off; the purging must in particular be interrupted. The detection of an actuation can take place by means of a clutch pedal switch for activating a valve (electrically) or else by means of the pressure rise in the hydraulics (hydraulic/mechanical). In the event of a pressure rise in the pressure line between the master cylinder and the slave cylinder, an alternate abutment of sealing elements, for example, can open and close corresponding hydraulic regions. It is in particular provided that the means for blocking and opening the further branch line are embodied as a self-ventilating valve. In this way, the second branch line is a freely switchable return line. To form the freely switchable return line, the self-ventilating valve is preferably designed such that a sealing body which is embodied in particular as a ball is moved from a first position into a second position as a result of an increased oil pressure in the pressure space of the slave cylinder. With decreasing pressure in the pressure space of the slave cylinder, the sealing body is returned from the second position into the first position as a result of a spring force. Here, during the movement of the sealing body, the second branch line is opened for a short period, such that during said period, a volume flow of hydraulic liquid flows back on the sealing body into the compensating tank volume.

To actuate the clutch device, the first branch line is closed off for example during an initial compression movement of the piston of the master cylinder, by virtue of the piston closing off an opening in the pressure space of the slave cylinder to the first branch line.

Other features which are considered as characteristic for the invention are set forth in the appended claims.

Although the invention is illustrated and described herein as embodied in clutch system having a hydraulically actuable clutch device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
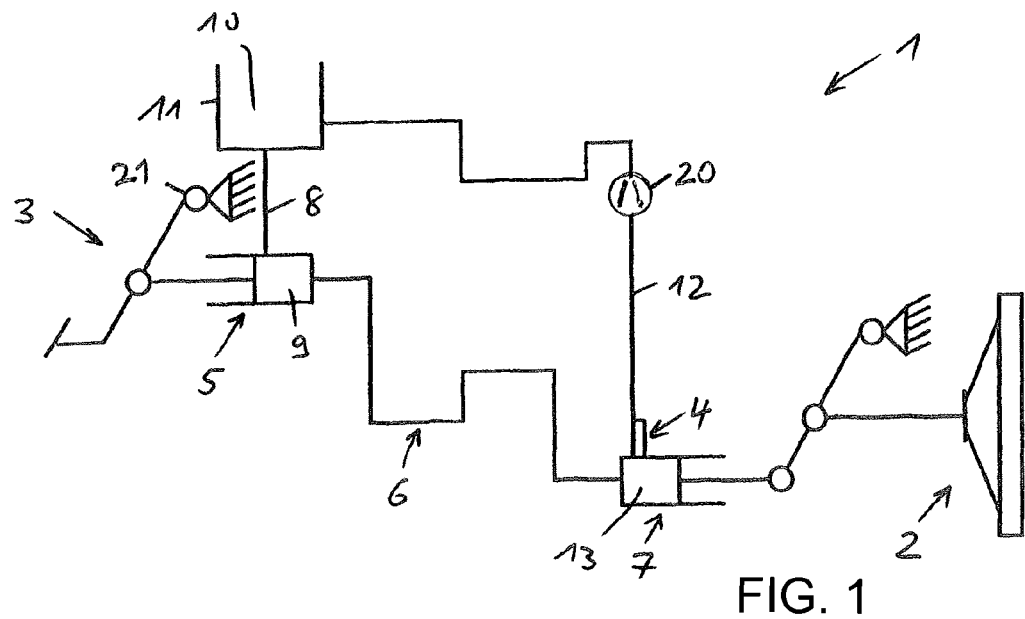
FIG. 1 is a diagrammatic sketch of the clutch system according to the invention.

Referring now to the figures of the drawing in detail and first, particularly, to FIG. 1 thereof, the illustrated clutch system 1 for a motor vehicle with a manual shift transmission has a clutch device 2, an actuating device 3 for the hydraulic actuation of the clutch device 2, and a hydraulic system. The hydraulic system has a master cylinder 5 which can be actuated by means of the actuating device 3, which is embodied as a pedal arrangement, and a slave cylinder 7, which is connected to the master cylinder 5 by means of a pressure line 6, for actuating the clutch device 2. Further parts of the hydraulic system are a first branch line 8, which connects the pressure space 9 of the master cylinder 5 to a compensating tank volume 10 of a compensating tank 11, and a second branch line 12 which connects the pressure space 13 of the slave cylinder 7 to the compensating tank volume 10. The pressure line 6 extends from the slave cylinder 7 to the master cylinder 5 and is provided with one or more siphons.

Means for opening and blocking the further branch line 12 interact with the second branch line 12, which means are embodied as a valve 4. The valve 4 is connected to the slave cylinder 7 and is acted on directly by the pressure of the pressure space 13 of the slave cylinder 7.

The valve 4 has a sealing body 15, which is arranged in a valve housing 14 and which is embodied as a ball, and a spring 16, which is mounted in the valve housing 14, for acting on the sealing body 15. Also formed in the valve housing 14 are two sealing seats 17 and 18 in the end positions of the sealing body 15, and a bypass 19 which is situated between the sealing body 15 and the valve housing 4. The sealing body 15 seals off the sealing seat 17 to the pressure space 13 of the slave cylinder 7 in the first end position, shown in FIG. 2, with the spring 16 relatively relaxed, and seals off the sealing seat 18 to that region of the second branch line 12 which faces toward the compensating tank volume 10 in its second end position with the spring 16 relatively compressed. A bypass function of the valve 19 is realized in the intermediate position of the sealing body 5. The valve housing 14 is alternatively designed without a centrally-formed bypass recess. The bypass function is accordingly generated by the different diameters of the valve housing 14 and ball or sealing body 15.

The clutch system described herein has an inherently safe self-ventilating hydraulic system. This can be obtained for example by means of a permanent exchange of, or by purging, the hydraulic liquid including the air contained therein during normal driving operation.

For purging the hydraulic system, a circuit with the pressure line 6 is formed by way of the two branch lines 8 and 12. In the second branch line 12, the air-liquid mixture is fed to the compensating tank volume 10 in which air separation takes place. The energy required for providing such permanent purging of the hydraulic system can be imparted for example by using a pump 20 (illustrated only as one of several implementations), by means of the pressure build-up during the clutch actuation, thermodynamic effects or by means of other stimuli such as pressure fluctuations in the clutch hydraulics. That is, there are provided means for feeding the hydraulic liquid in circulation through the hydraulic system.

To actuate the clutch device 2, the hydraulic system must be closed off and the purging must be interrupted. The detection of an actuation can take place by means of a clutch pedal switch 21 for activating a valve, in particular electrically, or else by means of the pressure rise in the hydraulics, in particular hydraulically/mechanically. The latter mode of operation is realized in the exemplary embodiment shown in FIG. 2: the first branch line 8 is closed off during an initial compression movement of the piston of the master cylinder 5, by virtue of the piston sealing off an opening in the pressure space 9 to the first branch line 8. Furthermore, the valve 4 closes off the second branch line 12 in the event of a pressure rise. The alternative, or additional backup system, is illustrated in FIG. 3. As soon as the pedal switch or sensor 21 senses that the clutch is being activated, an electrical valve 22 (here, diagrammatically illustrated as a rotary valve) is caused to close off the second branch line 12 and to prevent any further flow of hydraulic fluid 13 in the line 12.

Figure 2:
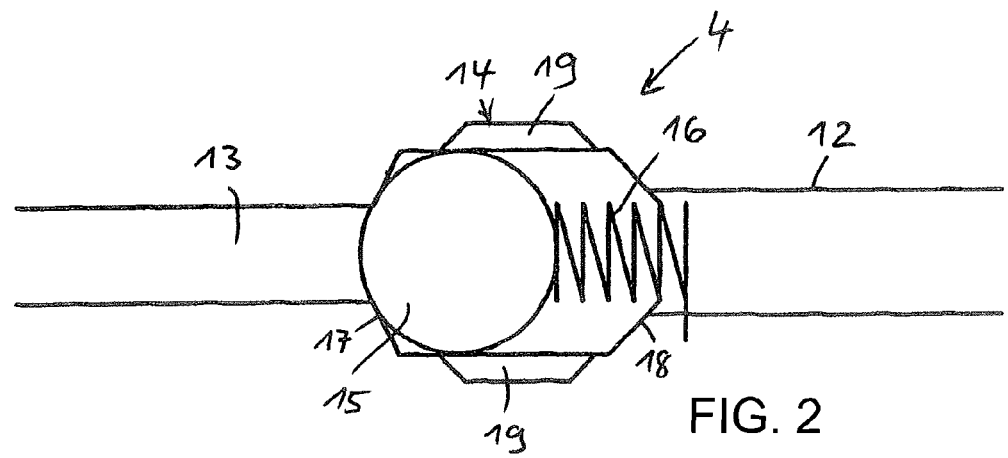
FIG. 2 is diagrammatic view of the means, which are used in the clutch system according to the invention, for blocking the feed of the hydraulic liquid.
Figure 3:
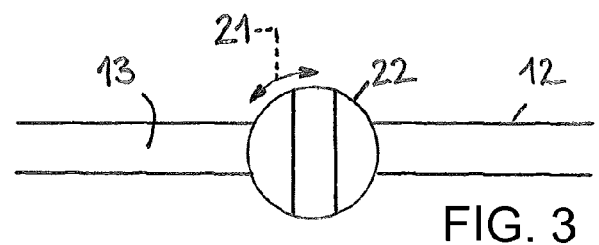
FIG. 3 is a diagrammatic view of an alternative embodiment of the blocking system for closing off the second bypass line.

In the valve shown in FIG. 2, which realizes the function of a self-ventilating valve, the sealing body 15 is pushed out of the sealing seat 17 into the sealing seat 18 in the event of a correspondingly high pressure rise in the slave cylinder 7. During the movement of the sealing body 15, a volume flow of the operating medium, or liquid-air mixture, flows past the sealing body 15 which is embodied as a ball, into the second branch line 12 which forms the function of a return line. If the pressure in the slave cylinder 7 falls again, the sealing body 15 returns to the sealing seat 17; during the changeover in abutment, a volume flow is again possible on account of the pressure gradient in the direction of the second branch line 12 on account of the bypass 19. By means of different effective sealing diameters in the sealing seats 17 and 18, it is possible to realize different closing times for the two movement directions of the sealing body 15.

In order to ensure fast alternating abutment of the sealing body 15 against the sealing faces, in particular from the sealing seat 17 to the sealing seat 18, it is possible to utilize a servo effect. This consists in that, in the event of a pressure rise, after the sealing body 15 has risen up from the sealing seat 17, the effective pressure-loaded area is increased in order to obtain fast abutment in the other sealing seat 18 even with the counterforce of the spring 16. This prevents an unsealed position of the ball 15 between the sealing seats 17 and 18, reduces the opening time and, overall, prevents the pedal from sticking on account of the ventilating action by the valve 4. The return path of the sealing body 15 to the sealing seat 17 is assisted by the spring 16.

The volume flow which occurs during the clutch actuation is lacking in the hydraulic system and represents a travel loss of the clutch actuation. In order to ensure the functional reliability of the clutch system, the travel loss, that is to say the volume flow, must be as small as possible.

In order to ensure a small volume flow, in addition to the described servo effect, the geometric spacings of the sealing body 15 to the valve housing 14 and of the sealing seats 17, 18 to one another are selected to be correspondingly small. The small spacing also assists in preventing a possible floating state of the sealing body 15 between the sealing seats 17, 18 in which a permanent volume flow is possible.

Furthermore, to adapt the volume flow, the opening and closing pressures of the valve 4 are preferably optimized. The opening pressure is to be selected such that it is reached with a small pressure build-up in the hydraulic system. In this way, during movements of the actuating device 3 by the working range of the valve 4 during the return movements of the actuating device, in particular a return bore (not shown) in the master cylinder 5 is opened and the volume loss is compensated by the return flow of hydraulic liquid via the first branch line 8. In this way, it can be prevented that the driver, by "playing" on the actuating device 3 and constantly actuating the clutch device without opening the return bore in the master cylinder, constantly actuates the valve 4 and can thereby provoke high volume flow losses or travel losses in the hydraulic system.

The pressure oscillations in the hydraulic system incited by the engine of the vehicle can be utilized to permit permanent purging of the hydraulic system. In order that the self-ventilating valve 4 is actuated only at certain excitation frequencies or dynamic actuating pressures, calibration can be carried out by means of throttles or orifices.

The invention claimed is:

1. A clutch system, comprising:
   a clutch device and an actuating device for hydraulically actuating said clutch device; and
   an hydraulic system, said hydraulic system including:
      a master cylinder to be actuated by way of said actuating device, said master cylinder having a pressure space;
      a slave cylinder for actuating said clutch device, said slave cylinder having a pressure space;
      a pressure line connecting said master cylinder with said slave cylinder;
      a compensating tank volume;
      a first branch line communicating with said compensating tank volume and connected to said pressure space of said master cylinder or between said pressure space of said master cylinder and said pressure space of said slave cylinder;
      a second branch line communicating with said compensating tank volume and connected to said pressure space of said slave cylinder or between said pressure space of said master cylinder and said pressure space of said slave cylinder; and
      means for blocking said second branch line during an actuation of said clutch device by way of said actuating device, said means for blocking having an automatically opening and closing valve for opening and closing a passage of said second branch line, said valve having a valve housing, a sealing body disposed in said valve housing, and a spring for acting on said sealing body, said valve housing formed with two sealing seats and a bypass formed between said sealing body and said valve housing, said sealing body configured to assume a first end position for sealing off said sealing seat to said pressure space of said slave cylinder, a second end position for sealing off said sealing seat to a region of said second branch line facing toward said compensating tank volume, and an intermediate position in which a bypass function is realized, and said spring is relatively relaxed in said first end position and relatively compressed in said second end position.

2. The system according to claim 1, which comprises means for feeding a hydraulic liquid in circulation through said hydraulic system.

3. The system according to claim 1, which comprises a sensor for detecting an actuation of said actuating device and an electric valve in said second branch line, wherein said sensor, upon detecting an actuation of said actuating device, causes said electric valve to close off said second branch line.

4. The system according to claim 1, wherein said sealing body is a ball.

5. The system according to claim 4, wherein the sealing seats have mutually different sealing diameters.

6. The system according to claim 1, wherein said bypass is formed with a gap.

7. The system according to claim 1, wherein said valve has an opening and closing characteristic curve selected such that said valve opens when there is an overpressure in said hydraulic system.

* * * * *